United States Patent [19]

Wilson

[11] 4,414,126
[45] Nov. 8, 1983

[54] AQUEOUS COMPOSITIONS CONTAINING CORROSION INHIBITORS FOR HIGH LEAD SOLDER

[75] Inventor: Joe C. Wilson, Woodhaven, Mich.

[73] Assignee: BASF Wyandotte Corporation, Wyandotte, Mich.

[21] Appl. No.: 313,687

[22] Filed: Oct. 22, 1981

[51] Int. Cl.³ ............................................... C09K 5/00
[52] U.S. Cl. .................................. 252/78.3; 252/78.5; 252/78.1; 252/77; 252/389 A; 252/391; 252/392; 252/402; 252/403; 422/7; 422/15; 422/16; 422/18
[58] Field of Search ................... 252/389 A, 391, 392, 252/400 A, 402, 403, 75, 77, 78.1, 78.5, 78.3; 422/7, 15, 16, 18

[56] References Cited

U.S. PATENT DOCUMENTS

| | | | |
|---|---|---|---|
| 2,384,553 | 9/1945 | Kiffer | 252/78.1 |
| 3,198,820 | 8/1965 | Pines et al. | 252/78.3 |
| 3,238,136 | 3/1966 | Willard et al. | 252/75 |
| 3,282,846 | 11/1966 | Scott | 252/75 |
| 3,312,622 | 4/1967 | Pines et al. | 252/78.3 |
| 3,513,097 | 5/1970 | Langenfeld | 252/78.3 |
| 3,607,757 | 9/1971 | McDonald | 252/75 |
| 3,935,125 | 1/1976 | Jacob | 422/15 |
| 4,163,733 | 8/1979 | Beckman et al. | 252/389 A |
| 4,206,156 | 6/1980 | Kamiya et al. | 260/944 |
| 4,209,487 | 6/1980 | Hogue | 422/12 |
| 4,217,216 | 8/1980 | Lipinski | 252/389 A |
| 4,219,433 | 8/1980 | Manabe et al. | 260/389 A |
| 4,242,214 | 12/1980 | Lambert, Jr. | 252/75 |
| 4,246,030 | 1/1981 | Lipinski | 252/389 A |
| 4,333,843 | 6/1982 | Wing et al. | 252/78.3 |
| 4,338,209 | 7/1982 | Manabe et al. | 252/77 |

Primary Examiner—Delbert E. Gantz
Assistant Examiner—Raymond Covington
Attorney, Agent, or Firm—David L. Hedden

[57] ABSTRACT

Compositions and method of using said compositions for inhibiting the corrosion of high lead solder in aqueous systems are disclosed. Alkali metal aliphatic phosphonates in combination with alkali metal mercaptobenzothiazoles are effective inhibitors for the corrosion of high lead solder in aqueous systems.

13 Claims, No Drawings

AQUEOUS COMPOSITIONS CONTAINING CORROSION INHIBITORS FOR HIGH LEAD SOLDER

BACKGROUND OF THE INVENTION

1. Field of the Invention

This invention relates to the inhibition of corrosion of high lead solder exposed to aqueous systems.

2. Description of the Prior Art

The use of high lead solder, defined as those solders having about 95 percent by weight or more lead content with the remainder tin or tin and silver, is a relatively new development in the fabrication of heat exchange devices, particularly radiators, for use in the cooling system of internal combustion engines. The corrosion of high lead solder, as measured by weight losses under corrosion test conditions, is particularly severe as compared with ordinary lead-tin solders having no more than about 70 percent by weight lead content and the remainder tin and other metals.

Organic phosphates are known as components of corrosion resistant antifreeze compositions from U.S. Pat. Nos. 3,607,757; 4,209,487; and 3,282,846. In each of these references, an organic phosphate is disclosed for use either alone or in combination with other known corrosion inhibitors to inhibit the corrosion of metals in contact with aqueous liquids. In no one of the references is there any disclosure that high lead solder corrosion as the result of contact with an aqueous liquid can be inhibited utilizing the alkali metal aliphatic phosphonates disclosed by the applicant.

Other references disclosing organic phosphates or phosphonic acids or the use of such materials as corrosion inhibitors for metals in contact with aqueous liquids are U.S. Pat. Nos. 4,217,216; 4,246,030; 4,206,156; and 4,163,733.

SUMMARY OF THE INVENTION

It has been found that water-soluble aliphatic phosphonates can be used in combination with alkali metal mercaptobenzothiazoles in aqueous systems to inhibit the corrosion of high lead solder as indicated by weight loss with time. The aliphatic phosphonates in combination with alkali metal mercaptobenzothiazole can be admixed with conventional corrosion inhibitors to provide specific corrosion protection for other metals such as steel, aluminum and cast iron. Said corrosion inhibitors can be incorporated into antifreeze and antifreeze concentrate compositions comprising a water miscible alcohol having 1 to about 4 carbon atoms and 1 to about 3 hydroxy groups.

DETAILED DESCRIPTION OF THE INVENTION

This invention relates to a means of inhibiting the corrosion of high lead solder in contact with an aqueous system by utilizing in said aqueous system a water-soluble aliphatic phosphonate in combination with an alkali metal mercaptobenzothiazole. Specific embodiments of the invention are the use of said corrosion inhibitors in an antifreeze or antifreeze concentrate or other heat transfer composition, particularly for use in the cooling system of an internal combustion engine. In practice, the antifreeze concentrates are added to water in the cooling system of said engine in a quantity sufficient to lower the freezing point of the final solution to the desired temperature.

The water-soluble aliphatic phosphonates have special utility in the prevention of the corrosion of high lead solder (95 percent by weight or more lead content) which is in contact with circulating water such as in aqueous liquids moving through condensers, engine jackets, cooling towers, evaporators, or distribution systems or in other aqueous corrosive media. Before the discovery that the corrosion inhibiting, water-soluble aliphatic phosphonates were useful in inhibiting the corrosion of high lead solder exposed to aqueous liquids, not adequate means of protecting high lead solder existed. With ordinary lead solder, which is a mixture by weight of about 70 percent lead and about 30 percent tin, there is generally no particular difficulty in obtaining corrosion protection under similar conditions. Conventional corrosion inhibitors which are known to those skilled in the art can be utilized in aqueous liquids with satisfactory performance on ordinary lead solder.

The useful aliphatic alkali metal phosphonates of the invention correspond to the following formula:

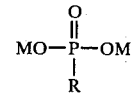

wherein R is hydrogen or a monovalent aliphatic group of 1 to about 18 carbon atoms such as methyl, ethyl, propyl, butyl, pentyl, hexyl, heptyl, octyl, nonyl, etc., and M is a monovalent cation individually selected from the group consisting of hydrogen, an alkali metal, ammonium, alkylammonium, alkyleneammonium, alkanolammonium, or mixtures thereof. In the formula, M can be alike or unlike but only one M can be hydrogen. M is generally any cation which will provide sufficient water solubility to allow the phosphorus-containing compound to function as a corrosion inhibitor. The alkali metals which are useful are sodium, lithium, potassium, and rubidium. Also included under the definition of M, are alkylammonium groups derived from amines having a low molecular weight such as below about 300 and more particularly alkyl amines, alkylene amines, and alkanolamines containing no more than 2 amine groups and 2 to about 18 carbon atoms such as ethylamine, diethylamine, propylamine, propylene diamine, hexylamine, 2-ethylhexylamine, N-butyl ethanol amine, triethanol amine, and the like, as illustrating the preferred amines. It is to be understood that the preferred ions are those which render the phosphonate compound of the invention a water-soluble salt in concentrations of at least about 0.001 percent by weight in an aqueous solution. Preferably, this is accomplished using an alkali metal ion or alternatively ammonium, alkylammonium, alkyleneammonium, and alkanolammonium ions. The alkali metal and ammonium salts described above are produced from the aliphatic, preferably the alkyl phosphonic acid by partial or full neutralization with the corresponding hydroxide, carbonate, amine, or the like.

Mixtures of an alkai metal mercaptobenzothiazole and the preferred alkyl phosphonates are used in accordance with the invention to effectively inhibit the corrosion of high lead solder in aqueous media. Said phosphonates are utilized in a corrosion inhibiting amount of at least about 0.001 percent by weight, generally from about 0.001 percent to about 0.01 percent by weight, preferably about 0.002 percent to about 0.008 percent by weight, and most preferably about 0.002 percent to about 0.006 percent by weight, all based upon the weight of the corrosive aqueous medium.

The preferred alkyl phosphonates are generally effective in basic aqueous corrosive media. The corrosion inhibitors of the invention are useful in aqueous alcohol based antifreeze compositions which are generally maintained at a pH of at least 7, preferably about 8 to about 11. The corrosion inhibitors of the invention are also useful in heat transfer media utilized in cooling towers wherein the aqueous system is generally maintained at a pH of from about 6.5 to about 10.

The alkali metal mercatobenzothiazoles are used in said mixtures in an effective corrosion inhibiting amount of at least about 0.1 percent by weight, generally about 0.1 percent to about 0.5 percent by weight, preferably about 0.15 percent to about 0.4 percent by weight, most preferably about 0.2 percent to about 0.3 percent by weight, all based upon the weight of the aqueous media.

Both organic and inorganic compounds known in the prior art as useful in inhibiting the corrosion of metals in contact with aqueous liquids can be used in mixtures with the corrosion inhibitors of the invention. These include the inorganic metal oxides and salts as well as organic corrosion inhibitors such as the phosphonate siloxanes, i.e., the silyl alkyl esters of phosphorus or the sulfonate siloxanes, i.e., the silyl hydrocarbyl esters of sulfur. The phosphorus esters are disclosed in U.S. Pat. No. 4,093,641 and their use as corrosion inhibitors in aqueous liquids is disclosed in German Offenlegunsschrift No. 2,912,430. The use of the silyl hydrocarbyl esters of sulfur (sulfonate siloxanes) as corrosion inhibitors for metals in contact with aqueous liquids is disclosed in copending U.S. patent application Ser. No. 249,916, filed Apr. 1, 1981 and Ser. No. 250,050 filed Apr. 1, 1981. Both the above-referenced patents and the referenced patent applications are incorporated herein by reference. Representative metal oxide corrosion inhibitors and salts thereof are the metal nitrates, nitrites, silicates, carbonates, for instance sodium silicate, sodium nitrite, sodium nitrate, sodium carbonate, potassium nitrite, ammonium silicate and such metal oxides as zinc oxide, calcium oxide, and various combinations thereof.

The phosphonate siloxanes, which are disclosed in German Offenlegunsschrift No. 2,912,430, are utilized as corrosion inhibitors in aqueous systems to inhibit the corrosion of metals in combination with water-soluble silicates. It is believed that a copolymer is formed between the phosphonate siloxane and the water-soluble silicate such that the gelation tendency of the water-soluble silicate at a pH of about 8 to about 11 is effectively inhibited so as to maintain the anticorrosive activity of the silicate. Other conventional organic corrosion inhibitors can be utilized in combination with a water-soluble silicate such as those disclosed in U.S. Pat. Nos. 3,341,469; 3,337,496; 3,312,622; 3,198,820; 3,203,969; and 3,248,329 all incorporated herein by reference.

The antifreeze concentrates of the invention are prepared by first dissolving in a water-alcohol blend (preferably ethylene glycol in combination with diethylene glycol) the water-soluble silicate, the sodium nitrate and the organosiloxane, preferably a phosphonate siloxane or a sulfonate siloxane. Subsequently, the composition is rendered basic by the addition of sodium hydroxide. The aliphatic phosphonate salt is next added to the mixture and the alkali metal mercaptobenzothiazole is then generally added as a 50 percent aqueous solution. Optionally, an antifoam agent is used which is a low foaming polyoxyethylene adduct of a polyoxypropylene hydrophobic base having a molecular weight of about 1750 wherein the oxyethylene content is about 10 weight percent of the molecule. Additional low foaming nonionic surface active agents are disclosed in U.S. Pat. Nos. 3,340,309; 3,504,041; and 3,770,701 as well as U.S. Pat. No. 2,425,755. The disclosures of low foaming nonionic surface active agents in the above-mentioned U.S. patents are incorporated herein by reference.

The resultant antifreeze concentrate composition can be diluted with water in accordance with prior art practice to produce an antifreeze fluid or heat transfer medium having the desired freezing point. It is understood that the quantities of metal corrosion inhibitor described herein are based upon the weight of the antifreeze concentrate. This is distinguished from the diluted concentrate which is actually used as the coolant or heat transfer medium in the cooling system of an internal combustion engine or in a cooling tower. As a general rule, the concentrate can be diluted with about 1 to about 3 volumes of water to arrive at the coolant fluid which is circulated in said engine cooling system or in a cooling tower. Smaller or larger quantities of water can be added as necessary to avoid the freezing of the coolant.

The use of alkali metal mercaptobenzothiazoles in combination with the water soluble phosphonates of the invention is necessary to obtain an unexpected improvement in corrosion resistance of high lead solders. Only where the alkali metal mercaptobenzothiazole is utilized in combination with said phosphonates can the unexpectedly, synergistic, improved corrosion resistance results be obtained. As an alternative for the alkali metal mercaptobenzothiazoles, no subsitute has been found.

The freezing point depressant utilized in the antifreeze compositions of the invention can be any suitable water-soluble liquid alcohol used heretofore in formulating antifreeze compositions. The water-soluble alcohols containing 1 to about 4 carbon atoms and 1 to about 3 hydroxy groups are generally used as freezing point depressants. Ethylene glycol is preferred as the freezing point depressant and especially the commercially available mixtures containing largely ethylene glycol and a small amount of diethylene glycol. The commercial mixture generally contains at least 85 to 95 percent by weight of ethylene glycol with the remainder being diethylene glycol and small amounts of substances which are incidentally present such as water. Other water-soluble liquid alcohols can be admixed with ethylene glycol but such admixtures usually are not preferred. Inexpensive commercially available water-soluble alcohols can also be used such as methyl, ethyl, propyl, and isopropyl alcohol alone or in mixtures.

In evaluating the corrosion resistance of high lead solder in the presence of liquids, the ASTM D-1384 Glassware Corrosion Test was utilized and is incorporated herein by reference.

The following examples illustrate the various aspects of the invention but are not intended to limit its scope. Where not otherwise specified throughout this specification and claims, temperatures are given in degrees centigrade and parts, percentages, and proportions are by weight.

EXAMPLE 1

An antifreeze concentrate was prepared from a commercial mixture of ethylene glycol which contains about 5 percent by weight diethylene glycol. The antifreeze concentrate contained 89.9 grams ethylene glycol and 4.73 grams of diethylene glycol. This composition was combined with 1.22 grams of phosphoric acid (85 percent by weight) and 1.5 grams of sodium hydroxide (50 percent by weight). In a second container, there was added 1.15 grams of water, 0.5 gram of sodium nitrate, 0.01 gram of sodium molybdate, 0.4 gram of sodium silicate and 0.04 gram of a 50 percent by weight aqueous solution of a phosphonate siloxane having the formula

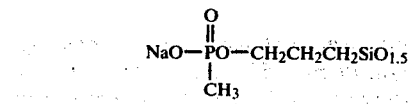

After each addition of solid materials, the mixture was stirred to dissolve these materials before proceeding to add subsequent ingredients. The separate mixture of materials was then added to the ethylene glycol-containing mixture and after stirring thoroughly, the pH was determined. After insuring that the pH is between 9 and 10, sodium mercaptobenzothiazole (50 percent aqueous) was added in the amount of 0.25 gram (solids). Lastly, an antifoam agent was added in the amount of 0.3 gram. This was a low foaming polyoxyethylene adduct of a polyoxypropylene hydrophobic base having a molecular weight of about 1750 wherein the oxyethylene content is about 10 weight percent of the molecule. It is noted that about 5 percent by weight of the phosphonate siloxane (0.002 grams) was disodium methyl phosphonate which is present as an impurity.

EXAMPLE 2

The procedure of Example 1 was repeated except that the phosphonate siloxane ingredient contained 15 weight percent (0.006 grams) of disodium dimethyl phosphonate.

EXAMPLE 3

The procedure of Example 1 was repeated utilizing 0.008 grams of disodium methyl phosphonate.

Testing the above examples in accordance with ASTM D-1384 Glassware Corrosion Test gave the following results in weight loss, in milligrams per specimen, which are reported in the following Table.

TABLE

| | ASTM D-1384 Glassware Corrosion Test Weight Loss (milligrams) | | | | |
|---|---|---|---|---|---|
| | Example | | | | |
| Corrosion Specimen | 1 | 2 | 3 | 7 (control) | 8 (control) |
| Copper | 4 | 4 | 4 | 4 | 11 |
| 2004 Solder[1] | 41 | 19 | 30 | 78 | 51 |
| 2006 Solder[2] | 2 | 2 | 2 | 5 | 9 |
| Brass | 4 | 4 | 3 | 6 | 6 |
| Steel | 2 | 2 | 2 | 2 | 1 |
| Cast Iron | 7 | 7 | 8 | 43 | 57 |
| Aluminium | +4 | +2 | +5 | 6 | +7 |

[1] 95.5% lead, 4% tin, 0.5% silver by weight
[2] 70% lead, 30% tin by weight

EXAMPLES 4-6

Examples 1-3 are repeated substituting disodium ethyl phosphonate for disodium methyl phosphonate. Similar corrosion results are obtained upon evaluation in the ASTM D-1384 Glassware Corrosion Test.

EXAMPLES 7-8

(Control—forming no part of this invention.)

Examples 1 and 3 were repeated omitting sodium mecaptobenzothiazole. Evaluation in the ASTM D-1384 Glassware Corrosion Test results in excessive corrosion on both high lead solder and cast iron as shown in the table above.

EXAMPLES 9-14

Examples 1-6 are repeated substituting the potassium methyl phosphonate and potassium ethyl phosphonate respectively for the sodium salts of Examples 1-6. Similar corrosion test results are obtained as compared with those results shown for the concentrates of Examples 1-6.

While this invention has been described with reference to certain specific embodiments, it will be recognized by those skilled in this art that many variations are possible without departing from the scope and spirit of the invention and that it will be understood that it is intended to cover all changes and modifications of the invention disclosed herein for the purposes of illustration which do not constitute departure from the spirit and scope of the invention.

The embodiments of the invention in which an exclusive privilege or property is claimed are defined as follows:

1. A corrosion resistant, alcohol-based antifreeze concentrate comprising a water-miscible alcohol and a corrosion inhibiting amount of a high lead solder corrosion inhibitor consisting essentially of a mixture of an alkali metal mercaptobenzothiazole and a phosphorus compound having the formula:

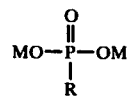

wherein R is a monovalent aliphatic group containing 1 to about 18 carbon atoms and M is a monovalent cation individually selected from the group consisting of hydrogen, an alkali metal, ammonium, alkylammonium, and alkyleneammonium with the proviso that only one M can be hydrogen.

2. The concentrate of claim 1 wherein said water-miscible alcohol has from 1 to about 4 carbons and from 1 to about 3 hydroxy groups and M is an alkali metal and wherein said antifreeze concentrate contains at least one conventional siloxane-silicate corrosion inhibitor.

3. The concentrate of claim 2 wherein said alkali metal mercaptobenzothiazole is sodium mercaptobenzothiazole present in the proportion of at least about 0.1 percent by weight of said antifreeze concentrate, said alcohol comprises ethylene glycol, and said siloxane-silicate corrosion inhibitor is selected from the group consisting of at least one of phosphonate and sulfonate siloxane silicate copolymers.

4. The concentrate of claim 3 wherein said phosphorus compound is an alkali metal alkyl phosphonate present in the proportion of at least about 0.001 percent by weight of said antifreeze concentrate and is selected from the group consisting of at least one of sodium methyl phosphonate and sodium ethyl phosphonate, and said siloxane-silicate is a phosphonate siloxane-silicate copolymer.

5. A corrosion-resistant liquid useful for inhibiting the corrosion of high lead solder in aqueous compositions comprising an aqueous liquid and a minor but effective corrosion inhibiting amount, sufficient to inhibit corrosion of high lead solder of a corrosion inhibitor consisting essentially of a mixture of an alkali metal mercaptobenzothiazole and a phosphorus compound having the formula

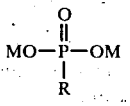

wherein R is a monovalent aliphatic group of 1 to about 18 carbon atoms and M is a monovalent cation individually selected from the group consisting of hydrogen, an alkali metal ion, ammonium, alkylammonium, and alkyleneammonium and wherein only one M can be hydrogen.

6. The composition of claim 5 wherein said alkali metal mercaptobenzothiazole is sodium mercaptobenzothiazole present in the proportion of at least about 0.1 percent by weight of said aqueous liquid, and said aqueous liquid comprises ethylene glycol.

7. The composition of claim 6 wherein said phosphorus compound is present in the proportion of at least about 0.001 percent by weight of said aqueous liquid and is selected from the group consisting of sodium methyl phosphonate and sodium ethyl phosphonate.

8. The composition of claim 7 wherein said aqueous liquid is an antifreeze composition additionally containing at least one conventional siloxane-silicate copolymer corrosion inhibitor.

9. The composition of claim 8 wherein said siloxane-silicate copolymers are utilized in a corrosion inhibiting amount and are selected from the group consisting of phosphonate siloxane-silicate copolymers and sulfonate silicone-silicate copolymers and said alkali metal alkyl phosphonate is selected from the group consisting of disodium methyl phosphonate and dipotassium methyl phosphonate.

10. In a process for inhibiting the corrosion of high lead solder in contact with an aqueous liquid, the improvement wherein said aqueous liquid comprises a mixture of water and an antifreeze concentrate comprising a water-miscible alcohol and a minor but effective corrosion inhibiting amount of at least about 0.001 percent by weight of a phosphorus compound having the formula:

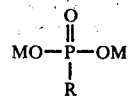

wherein R is a monovalent aliphatic group containing 1 to about 18 carbon atoms and M is a monovalent cation individually selected from the group consisting of hydrogen, an alkali metal, ammonium, alkylammonium, and alkyleneammonium with the proviso that only one M can be hydrogen and at least about 0.1 percent by weight of an alkali metal mercaptobenzothiazole.

11. The process of claim 10 wherein said water-miscible alcohol has from 1 to about 4 carbons and from 1 to about 3 hydroxy groups and M is an alkali metal and wherein said antifreeze concentrate contains at least one conventional siloxane-silicate corrosion inhibitor.

12. The process of claim 11 wherein said alkali metal mercaptobenzothiazole is sodium mercaptobenzothiazole present in the proportion of at least about 0.1 percent by weight of said aqueous liquid, said alcohol comprises ethylene glycol, and said siloxane-silicate corrosion inhibitor is selected from the group consisting of at least one of the phosphonate siloxane- and sulfonate siloxane-silicate copolymers.

13. The process of claim 12 wherein said phosphorus compound is an alkali metal alkyl phosphonate selected from the group consisting of at least one of sodium methyl phosphonate and sodium ethyl phosphonate, and said siloxane-silicate is a phosphonate siloxane-silicate copolymer.

* * * * *